United States Patent [19]

Pleva et al.

[11] Patent Number: 5,125,080
[45] Date of Patent: Jun. 23, 1992

[54] LOGIC SUPPORT CHIP FOR AT-TYPE COMPUTER WITH IMPROVED BUS ARCHITECTURE

[75] Inventors: Robert M. Pleva, Livermore; Robert W. Catlin, Santa Clara, both of Calif.

[73] Assignee: Chips and Technologies, Incorporated, San Jose, Calif.

[21] Appl. No.: 436,200

[22] Filed: Nov. 13, 1989

[51] Int. Cl.⁵ .................. G06F 12/06; G06F 13/36; G06F 15/06
[52] U.S. Cl. .................. 395/325; 395/250; 364/239; 364/246; 364/246.11
[58] Field of Search ... 364/200 MS File, 900 MS File

[56] References Cited

U.S. PATENT DOCUMENTS

| | | | |
|---|---|---|---|
| 4,425,615 | 6/1984 | Swenson et al. | 364/200 |
| 4,470,113 | 9/1984 | Oura | 364/200 |
| 4,727,509 | 2/1988 | Johnson et al. | 364/900 |
| 4,811,203 | 3/1989 | Hamstra | 364/200 |
| 4,920,477 | 4/1990 | Colwell et al. | 364/200 |

FOREIGN PATENT DOCUMENTS

3174157 7/1988 Japan .
3261445 10/1988 Japan .
276657 11/1988 Japan .

Primary Examiner—Michael R. Fleming
Assistant Examiner—Ayaz R. Sheikh
Attorney, Agent, or Firm—Townsend and Townsend

[57] ABSTRACT

A support chip includes substantially all the AT core logic, namely most of the X-bus peripherals (except for the keyboard controller), memory controllers, and swapper. The normal AT data paths are altered to reduce the pin count, with a resulting surprising improvement in capability. The chip interfaces to the microprocessor's local address and data buses and provides a 16-bit data bus corresponding to a 16-bit version of the X-bus data portion (XD-bus). External buffers coupled to the XD-bus provide a system data bus (SD-bus) corresponding to the S-bus data portion. The I/O channel is coupled to the SD-bus while system ROM is coupled to the XD-bus. To accommodate the fact that the swapper is internal, the support chip provides independent direction control of the high and low order buffers between the XD-bus and the SD-bus.

11 Claims, 6 Drawing Sheets

FIG. 1 (PRIOR ART)

FIG. 2A (UPPER LEFT)

FIG. 2B (UPPER RIGHT)

FIG. 2C (LOWER LEFT)

FIG. 2D (LOWER RIGHT)

FIG. 3

LOGIC SUPPORT CHIP FOR AT-TYPE COMPUTER WITH IMPROVED BUS ARCHITECTURE

BACKGROUND OF THE INVENTION

The present invention relates generally to computer architecture, and more specifically to a single-chip support circuit for an AT-type computer.

The IBM AT personal computer defined an industry-standard architecture based on an 80286 microprocessor (available from AMD or Intel). The architecture is defined by a number of buses beyond the local bus (having data and address portions) from the microprocessor. These include an S-bus, an X-bus and an M-bus. The S-bus is created from the local bus and includes a 16-bit data portion and a 24-bit address portion. The X-bus is a buffered version of the S-bus and includes a 16-bit address portion and an 8-bit data portion. The M-bus is a buffered version of the S-bus and includes a 16-bit data portion.

The microprocessor communicates with an optional 80287 mathematics co-processor on the local bus. The S-bus is coupled to the I/O channel, and to buffers for the X-bus and the M-bus. The X-bus is coupled to a number of peripherals, including DMA controllers, I/O ports, and a keyboard controller. The M-bus is coupled to program and system memory elements. A swapper is provided between the high and low order bytes on the S-bus to allow the data appearing on one byte of the bus to be transferred to the other. This provides flexibility and permits efficient use of 8-bit devices in a 16-bit bus environment.

As the art of chip design has evolved, it has become possible to integrate functions that formerly required large numbers of chips on many circuit boards into a small number of chips on a single board. However, achieving a high degree of integration is not simply a matter of drawing a big circle around all the boxes on the system block diagram and then designing the chip. Such apparently mundane factors as the current required by off-chip elements and the pin count come into play, and can pose formidable obstacles. For a one-chip or a few-chip design to be economically attractive, the chips must not be in such configurations as to require expensive, custom packages. It does no good to fit all the functionality onto a single chip and then find that the chip requires more pin connections than are available on economical packages.

SUMMARY OF THE INVENTION

The present invention provides a support chip incorporating most of the AT core logic, thus making it possible to implement an AT-compatible microcomputer system with very few physical components. The support circuitry is packaged in a standard 160-pin package, and within this constraint provides an enhanced bus architecture.

The support chip of the present invention includes substantially all the AT core logic, namely most of the X-bus peripherals (except for the keyboard controller), memory controllers, and swapper. The normal AT data paths are altered to reduce the pin count, with a resulting surprising improvement in capability. The chip interfaces to the microprocessor's local address and data buses and provides a 16-bit data bus corresponding to a 16-bit version of the X-bus data portion (XD-bus). External buffers coupled to the XD-bus provide a system data bus (SD-bus) corresponding to the S-bus data portion. The I/O channel is coupled to the SD-bus while system ROM is coupled to the XD-bus. To accommodate the fact that the swapper is internal, the support chip provides independent direction control of the high and low order buffers between the XD-bus and the SD-bus.

The revised architecture provides a number of benefits. First, the XD-bus is 16 bits wide, and therefore can support 16-bit ROM and other 16-bit peripherals without having to multiplex the data onto an 8-bit bus. Second, the number of pins is reduced. Providing sufficient internal buffering to drive the SD-bus directly would have required a fairly large number of extra power and ground pins on the chip. Sufficient drive for the I/O channel is provided by the external buffers between the XD-bus and the SD-bus, and control of these buffers requires only two pins from the chip. The use of an SD-bus off the XD-bus rather than separate XD-bus and SD-bus from the chip itself represents a saving of 8 pins.

A further understanding of the nature and advantages of the present invention may be realized by reference to the remaining portions of the specification and the drawings.

DESCRIPTION OF THE PREFERRED EMBODIMENT

Prior Art AT System

Figure 1:
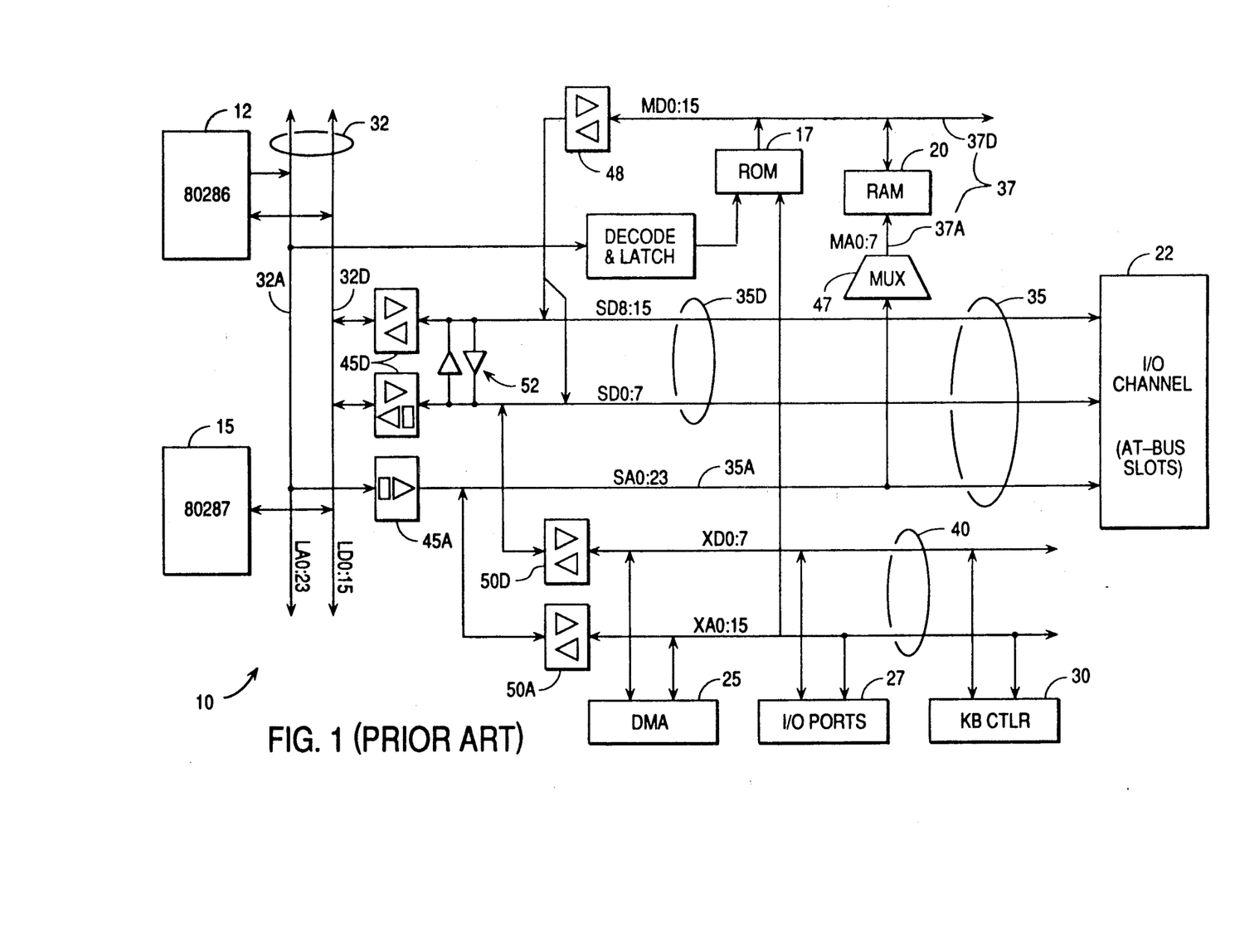
FIG. 1 is a simplified block diagram of a conventional (prior art) AT system.
Figures 2, 2A:
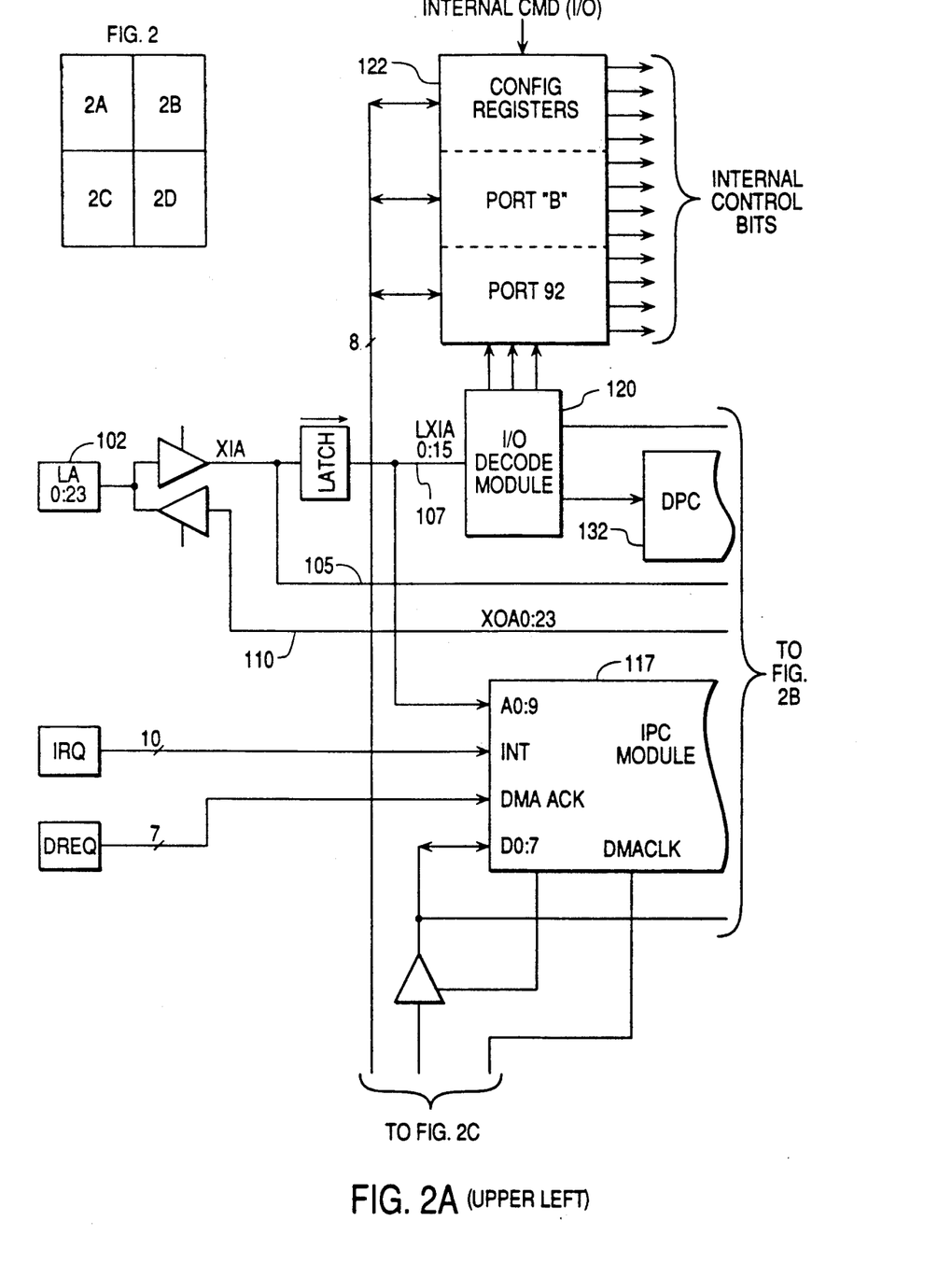
FIG. 2 comprises an organizational drawing for FIGS. 2A-D.
FIGS. 2A-D provide a simplified block diagram of the AT support chip of the present invention.
Figure 2B:
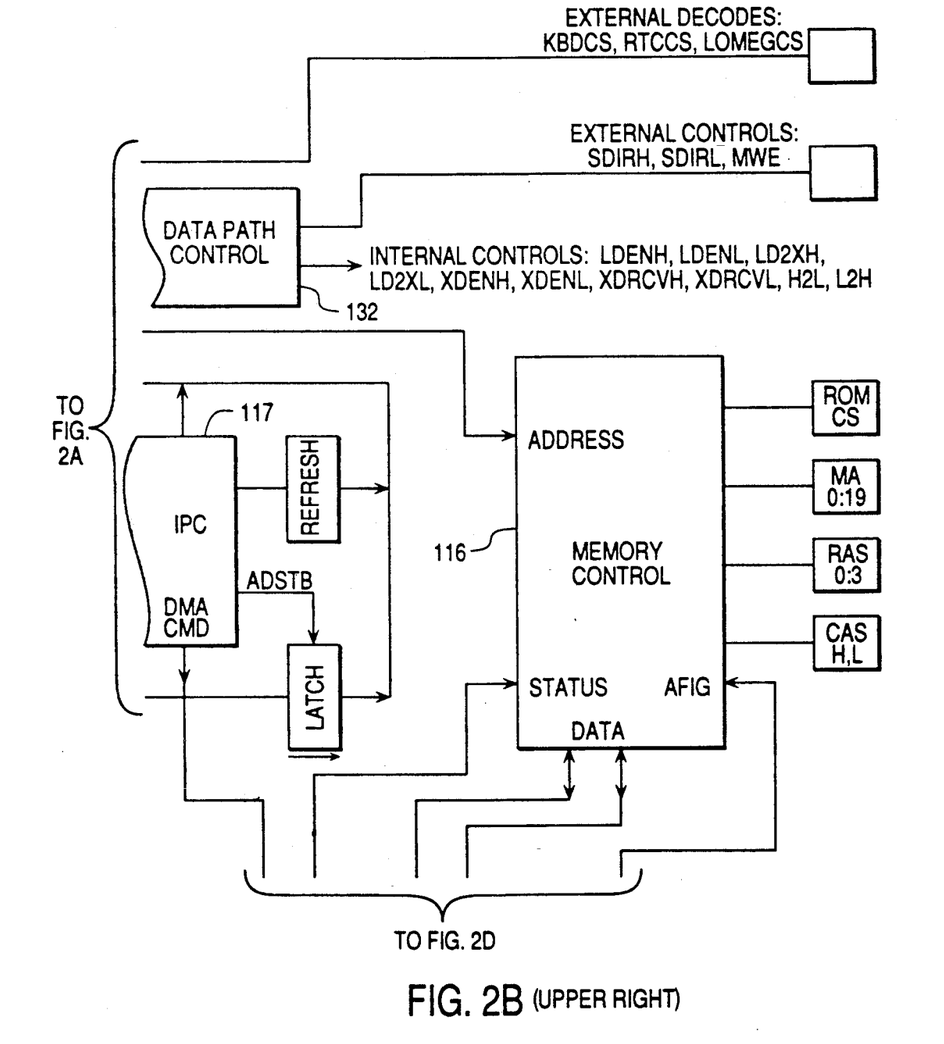
Figure 2C:
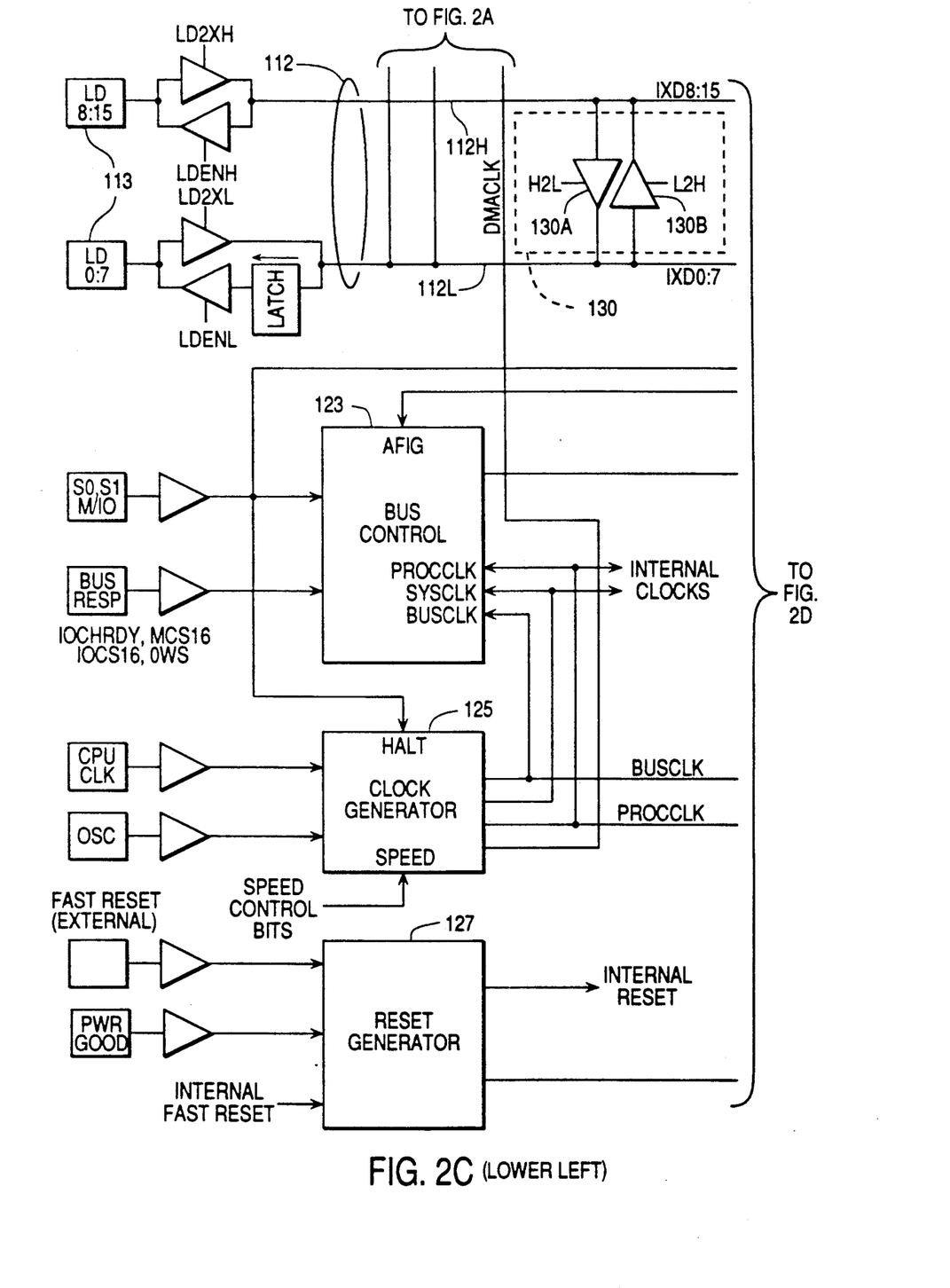
Figure 2D:
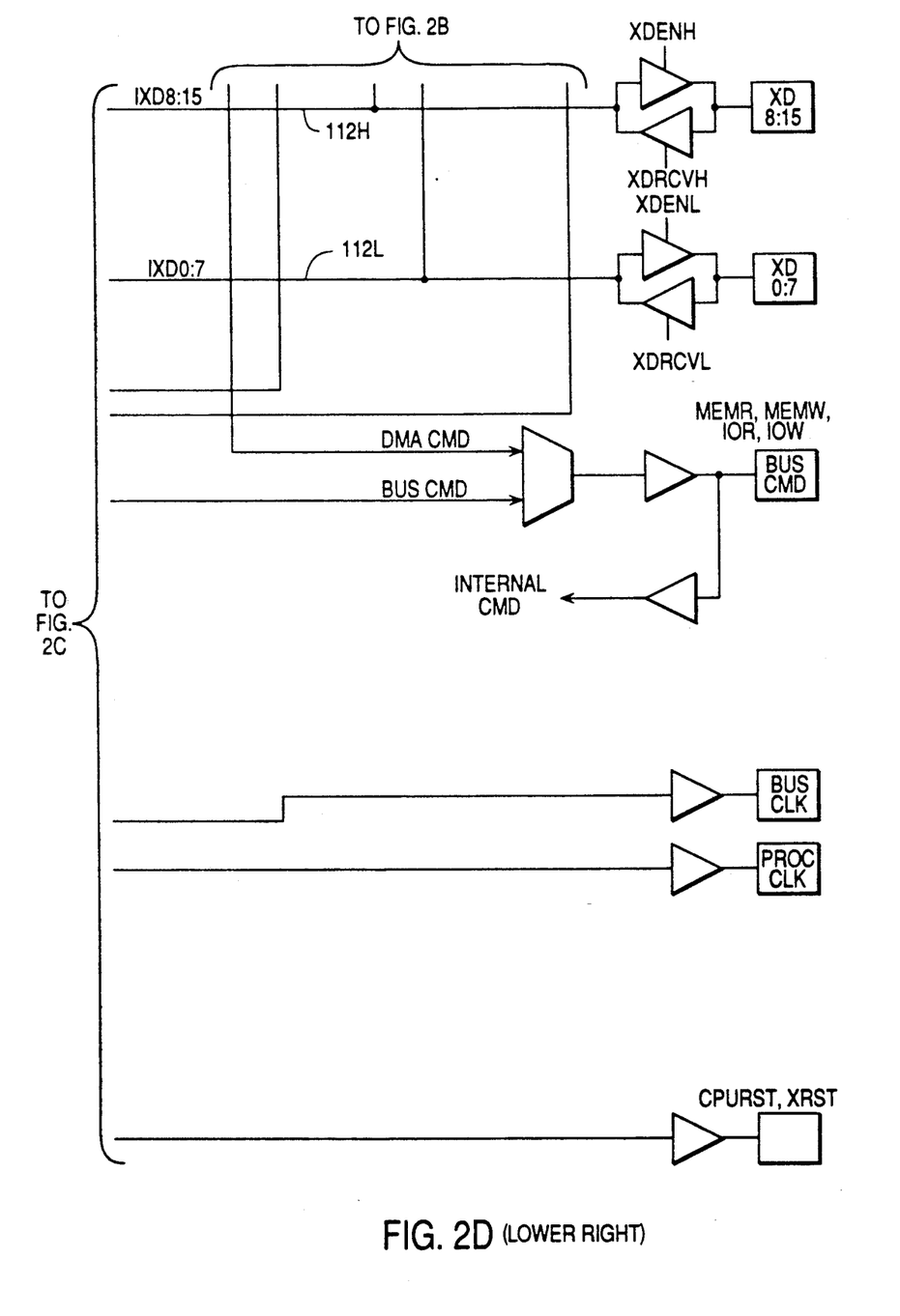

FIG. 1 is a simplified block diagram showing the major data and address paths in a prior art AT system 10. The basic system elements include a 80286 microprocessor 12, an optional 80287 math co-processor 15, system and program memory implemented as ROM 17 and RAM 20, an I/O channel 22, and a number of peripherals including a DMA controller 25, I/O ports 27, and a keyboard controller 30. The I/O channel provides slots on the bus into which are plugged cards for such devices as a video controller, hard disk controller, floppy disk controller, network card, or a CD-ROM controller.

Communication is established between various devices on a number of buses, including a local bus 32, a system bus (S-bus) 35, a memory bus (M-bus) 37, and a peripheral bus (X-bus) 40. Local bus 32 provides communication between microprocessor 12 and co-processor 15, and includes a 16-bit data portion (LD-bus) 32D and a 24-bit address portion (LA-bus) 32A. S-bus 35 includes a 16-bit data portion (SD-bus) 35D and a 24-bit address portion (SA-bus) 35A. M-bus 37 includes a 16-bit data portion (MD-bus) 37D and an 8-bit or 9-bit set of multiplexed address lines (MA-bus) 37A.

The local bus is coupled to the S-bus through L-S unidirectional latch buffers 45A (address portions) and L-S bidirectional buffers 45D (data portions). The S-bus is coupled to the M-bus by S-M multiplexers 47 (address portion) and S-M bidirectional buffers 48 (data portions). The S-bus is coupled to the X-bus by S-X bidirectional buffers 50A (address portions) and 50D (data portions). S-bus 35 is coupled to I/O channel 22; M-bus 37 is coupled to ROM 17 and RAM 20; and X-bus 40 is coupled to DMA controller 25, I/O ports 27, and keyboard controller 30. A swapper circuit 52 is coupled to SD-Bus 35D and allows the data on the high order byte to be put on the low order byte, or vice versa. This provides flexibility; for example, it allows the 8-bit XD-bus to communicate with either the high or low order byte of the SD-bus.

Due to the nature of the I/O channel devices, the SD-bus is a low impedance bus, and requires about 20 ma drive on each line. The reason for a separate XD-bus is that the devices that couple to the XD-bus have modest drive capability (about 2-4 ma on each line).

AT Support Chip

FIGS. 2A-D, taken together, provide a simplified block diagram of a support chip 100 according to the present invention. Chip 100 contains the core logic for implementing an AT-compatible computer system. The chip is implemented in a 1.5 micron CMOS process, and is packaged in a 160-pin plastic flat package (square). Appendix A is a table of the pin definitions. Each pin on chip 100 is provided with an internal receiver, driver, or transceiver, depending on whether it is an input pin, an output pin, or a bidirectional pin. The transceiver driver and receiver are typically capable of being individually enabled.

The chip has a set of bidirectional LA pins 102 for coupling to the 24-bit processor local address bus. The pin receivers drive an internal address bus (XIA-bus) 105, and a 16-bit latched version of the XIA-bus, referred to as LXIA-bus 107. The pin drivers are coupled to a 24-bit output address bus (XOA-bus) 110.

An internal data bus, referred to as IXD-bus 112, has high-order and low-order 8-bit segments 112H and 112L, and is coupled between a first set of bidirectional LD pins 113, adapted to couple to the processor's local data bus, and a second set of bidirectional XD pins 115 adapted to couple to an external 16-bit XD-bus to be discussed below. The low order driver to the local data bus is preceded by a latch.

A memory controller 116 is coupled to the XIA-bus and provides external signals for ROM address decoding, and for DRAM address and timing control. The DRAM control signals are provided on a set of ten multiplex address pins (external MA-bus), four row address strobe pins, and two column address strobe pins.

An integrated peripheral controller (IPC) 117 is coupled to the LXIA-bus and includes two DMA controllers, two interrupt controllers, a real time clock, and a timer/counter. An I/O decode module 120 is coupled to the LXIA-bus and provides select signals to control a set of ports and configuration, control, and status registers 122, which are coupled to the low order segment of the IXD-bus.

A bus controller 123 responds to cycles generated by the processor, and generates bus cycles for the external buses. Bus controller 123 provides bus commands, which are multiplexed with DMA commands from IPC 117 for output. A clock generator 125 receives signals from the processor and an off-chip oscillator and generates clock signals for the processor and the rest of the system. A reset generator 127 responds to a PWRGOOD signal from the external power supply, signifying that the voltage level is sufficient to provide reliable chip operation. The reset generator also responds to internal and external software reset signals.

A swapper 130 is coupled between the high and low order 8-bit segments of the IXD-bus, and operates to drive the data on one of the 8-bit segments onto the other 8-bit segment. The swapper comprises a set of drivers 130A and 130B, pointing in opposite directions between the two bus segments, and having individual enable inputs.

A data path control circuit 132 receives address information from I/O decode module 120 and provides internal and external control signals that define the data paths on the internal and external data buses. The internal control signals include signals for selectively enabling the XD drivers or receivers, for selectively enabling the swapper drivers, and for enabling the LD drivers and receivers. The external control signals are a pair of signals designated SDIRH and SDIRL, which are used to control the direction of external bidirectional buffers as will be discussed below.

As part of an effort to reduce the total pin count, a number of the pins on the chip, namely the DMA acknowledge output pins, are used as input pins to provide configuration information at power-on. More specifically, during a reset interval at power-on, the pin drivers from the DMA logic are disabled, and configuration signals are latched for use by other portions of the chip circuitry. The configuration signals are preferably provided by an active drive that is enabled only during the reset interval. Further details of this technique are disclosed in U.S. Pat. No. 5,051,622, issued Sept. 24, 1991, to Robert M. Pleva, titled "Power-On Strap Inputs."

As a further part of the effort to reduce the total pin count, a number of pins are used as multifunction pins. More particularly, a given pin has different purposes, depending on the configuration of the system. This is accomplished by enabling different on-chip data paths to (or from) the pin, depending on configuration signals. As noted above, these configuration signals may be communicated to the chip during reset at power-on.

A specific example relates to the optional external real time clock (RTC). The DACK5* pin is used at power-on to determine whether the system includes an external RTC. If it does, the MFP5 pin is used to provide a chip select for the external RTC. If it doesn't, the MFP5 pin is used as a power sense for the internal RTC.

System Incorporating AT Support Chip

Figure 3:
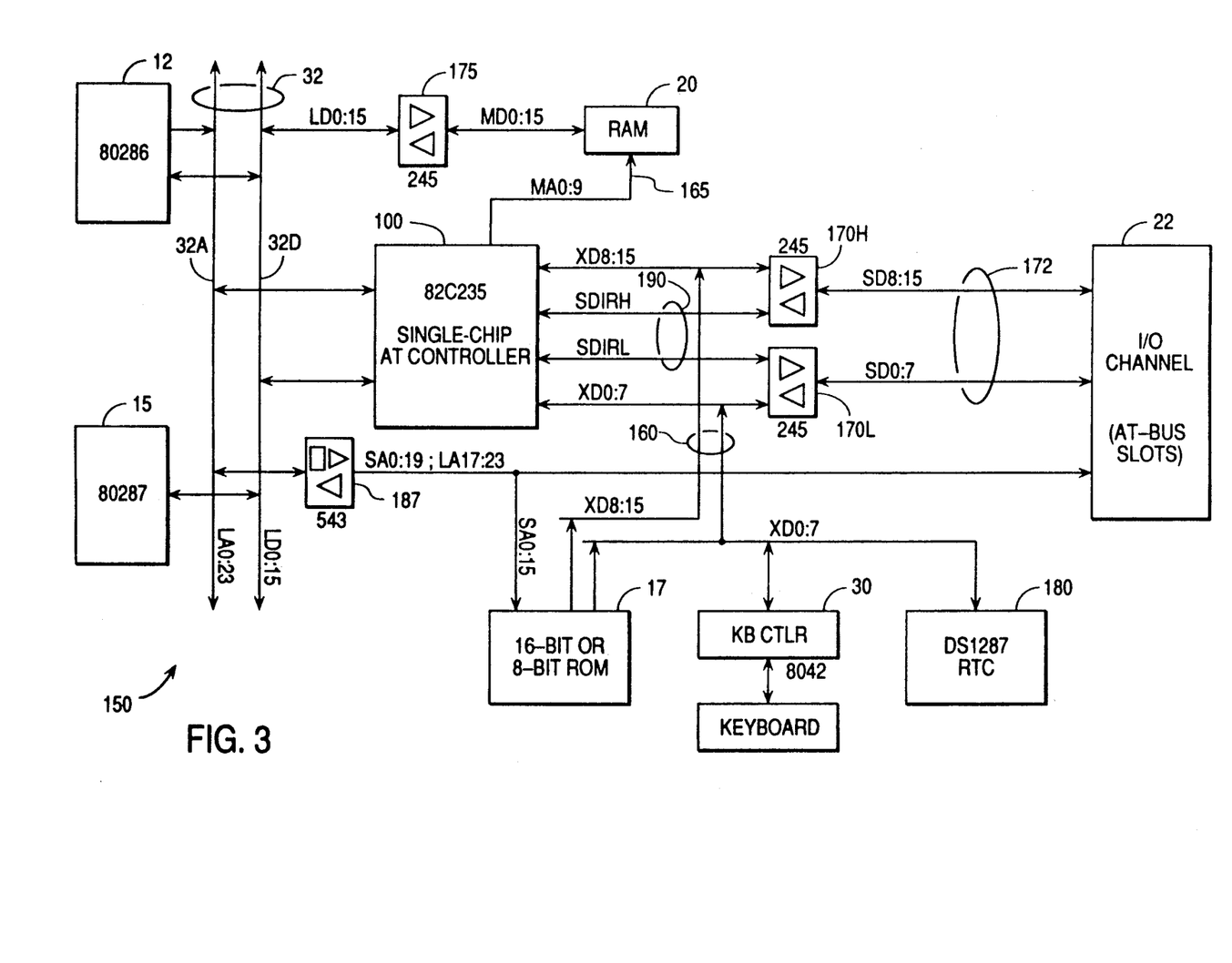
FIG. 3 is a simplified block diagram of a microcomputer system incorporating the AT support chip of the present invention.

FIG. 3 is a simplified block diagram illustrating the major data and address paths in a representative system 150 using support chip 100 according to the present invention. Elements corresponding to those in FIG. 1 will have the same reference numerals as FIG. 1.

Chip 100, due to the nature of its configuration, defines a different bus architecture from the standard AT computer. As in the prior art, the microprocessor 12 and co-processor 15 are coupled to the local bus, which also communicates with chip 100. As described above, chip 100 has sets of pins to define a 16-bit XD-bus 160 and a 10-bit set of multiplexed address lines (MA-bus) 165. XD-bus 160 communicates through a set of external X-S buffers 170 to a 16-bit SD-bus 172. SD-bus 172 drives I/O channel 22 in the manner of the system in FIG. 1. Chip 100 provides 4 ma drive on each XD line, which is sufficient for the X-bus, but typically not for the I/O channel.

RAM 20 is coupled to the local data bus through optional L-M data buffers 175 and receives its address information via MA-bus 165. ROM 17, which may be 8-bit or 16-bit ROM, is coupled to the relevant portion(s) of XD-bus, as are external keyboard controller 30 and an optional external real-time clock 180. The local address bus is coupled to an SA-bus 185 via L-S address buffers 187. ROM 22 receives its address information from the SA-bus.

X-S buffers 170 include separate high and low order transceivers 170L and 170H for the low-order and high-order bytes. Chip 100 provides a pair of lines 190 SDIRL and SDIRH for controlling the direction of transceivers 170L and 170H independently. The need for independent direction control of the high-byte and low-byte transceivers arises from the fact that the swapper is inside chip 100. One of many possible examples where the transceivers would have to point in opposite directions would be the case of an 8-bit channel device coupled to the low-order SD lines and a 16-bit master coupled to the entire 16-bit SD-bus. Assuming the master wants to read an odd byte from the device, it expects to receive it on the high-order SD lines. Therefore, the data must go toward chip 100 on the low order lines, get swapped by swapper 130 and transmitted to the master on the high order lines. Therefore, buffer 170L must point from the SD-bus to the chip while buffer 170H must point from the chip to the SD-bus. It is the responsibility of the data path control circuit on chip 100 to determine, based on the type of transaction, the states of SDIRL and SDIRH.

Conclusion

In conclusion, it can be seen that the present provides a single-chip support circuit that provides a full 16-bit XD-bus (unbuffered except for low level buffers on the chip), and avoids the need for separate pinouts for the XD and SD buses. This is at the minimal expense of two pins to control the directions of the X-S buffers. By providing the buffers for SD-bus 172 off-chip, the need for many extra power and ground pins is avoided. This makes it possible to provide the full AT functionality within a commercially available 160-pin package.

While the above is a complete description of the preferred embodiment of the invention, various modifications, alternative constructions, and equivalents may be used. Therefore, the above description should not be taken as limiting the scope of the invention which is defined by the claims.

| APPENDIX A: 82C235 PIN DEFINITIONS ||||
| PIN NAME | TYPE | DRIVE | DESCRIPTION |
| --- | --- | --- | --- |
| LOCAL BUS INTERFACE: ||||
| A0:23 | I/O | 4 mA | Local address bus. |
| MODA0 | O | 4 mA | I/O channel least significant address output. Used during conversions. |
| MODA20 | I/O | 2 mA | Modified A20. |
| LD15:0 | I/O | 2 mA | Local data bus connection to 286 processor. |
| S0,S1 | I | | Status inputs from 80286. |
| M/IO* | I | | Status input from 80286. |
| BHE* | I/O | 2 mA | Byte high enable input from 80286. |
| READY | I/O | 2 mA | Processor cycle extend command. |
| HOLD | O | 2 mA | Processor hold request. |
| HLDA | I | | Processor hold acknowledge. |
| NMI | O | 2 mA | Processor non-maskable interrupt request. |
| INTR | O | 2 mA | Processor maskable interrupt request. |
| Numeric processor interface: ||||
| BUSY* | O,D | 2 mA | Latched numeric processor busy status to 80286. |
| NPBZ* | I,D | 4 mA | Numeric processor busy status to 80287. |
| NPCS* | O,D | 2 mA | Numeric processor chip select from 80287. |
| ERROR* | I,D | 4 mA | Error status from 80287. |
| NPRST | O,D | 2 mA | Reset signal to 80287. |
| Memory Interface: ||||
| MA0:9 | O | 4 mA | Multiplexed DRAM address lines. |
| RAS3*/RAST* RAS2*/RAS2C RAS1*/RAS1C RAS0*/RAS0C | I/O | 4 mA | DRAM row address strobes. These lines may be coded, requiring an external data selector. These lines are inputs when an 82C212 is installed. |
| CASH*/HLDA1 CASL*/AF16* | O I/O | 4 mA | DRAM column address strobes or 82C212 interface. Selected by configuration pin. |
| PARH,PARL | I/O | 4 mA | Memory parity bits. |
| MWE* | O | 8 mA | DRAM write enable and buffer direction control. |
| ROMCS* | I/O | 2 mA | ROM address decode to ROM. Input when 82C212 is installed. |
| Clocking: ||||
| CX1 | I | | Processor clock XTAL input. |

-continued

| APPENDIX A: 82C235 PIN DEFINITIONS | | | |
|---|---|---|---|
| PIN NAME | TYPE | DRIVE | DESCRIPTION |
| CX2 | O | | Processor clock XTAL output. |
| PROCCLK | O | 4 mA | Processor clock output. |
| BUSCLK | O | 4 mA | Bus clock output. |
| OX1 | I | | OSC clock XTAL input. |
| OX2 | O | | OSC clock XTAL output. (14.318 MHz nominal) |
| PC I/O Bus Group: | | | |
| XD0:15 | I/O | 4 mA | Data to System Bus (normally buffered externally) |
| XIOR* | I/O | 8 mA | System I/O read command. |
| XIOW* | I/O | 8 mA | System I/O write command. |
| XMEMR* | I/O | 8 mA | System memory read command. |
| XMEMW* | I/O | 8 mA | System memory write command. |
| LOMEGCS* | O | 4 mA | Low Meg Chip Select. (used to build SMEMR & SMEMW) |
| ALE | O | 8 mA | Address latch enable. |
| IOCHRDY | I/O | 4 mA | I/O channel cycle extend. |
| IOCHCHK* | I | | I/O channel error status. |
| IRQ3:7 IRQ9:12 IRQ14:15 | I,D | 2 mA | I/O channel interrupt requests. IRQ1,8 are MFP pins. IRQ13 is internal. |
| DREQ0:3 DREQ5:7 | I,D | 2 mA | I/O channel DMA requests. |
| | | DMA acknowledge outputs / | Reset configuration |
| DACK0* | O,C,D | 4 mA | DACK0* / SENSE 0 |
| DACK1* | O,C,D | 4 mA | DACK1* / SENSE 1 |
| DACK2* | O,C,D | 4 mA | DACK2* / SENSE 2 |
| DACK3* | O,C,D | 4 mA | DACK3* / 82C212 Not Installed |
| DACK4* | O,C,D | 4 mA | DACK5* / RTC Not Installed |
| DACK6* | O,C,D | 4 mA | DACK6* / 8042 Installed |
| DACK7* | O,C,D | 4 mA | DACK7* / 8-Bit ROM |
| TC | O | 2 mA | DMA transfer terminal count. |
| MASTER* | I | | Alternate bus master request. |
| 0WS/LBA* | I | | Zero Wait State request and Local Bus Access input signals. |
| REFRESH* | I/O | 8 mA | DRAM refresh. |
| IOCS16* | I/O | 4 mA | IO is 16-bits wide. |
| MEMCS16* | I/O | 4 mA | Memory is 16-bits wide. |
| Miscellaneous: | | | |
| | | | Multifunction pins: |
| MFP5 | I/O | 2 mA | RTC CS* / Power Sense |
| MFP4 | I | | INT8 (RTC) / 32 kHz input |
| MFP3 | I | 2 mA | CPURST2* (IN) / (Sense) |
| MFP2 | O | | 8042CS* / (KBD data) |
| MFP1 | I | | GATEA20 (IN) / (KBD clock) |
| MFP0 | I | | INT1 (KBD) / (Keylock) |
| ADRL* | O | 8 mA | Address latch strobe |
| PWRGOOD | I | | Power Good input from Power Supply. |
| CPURST | O | 2 mA | Processor reset output. |
| XRST | O | 2 mA | I/O channel reset output. |
| SPKOUT | O | 2 mA | Speaker data out. |
| SDIRH SDIRL | O | 2 mA | Channel Data bus control. (logic 1 points buffer out) |
| Vcc | I | | +5 volts |
| Vss | I | | 0 volts |
| Signal total: | 150 | | |
| Vcc total: | 4 | | |
| Vss total: | 6 | | |
| PIN TOTAL: | 160 | | |

PIN LEGEND:
I = input
O = output
C = configuration
D = diagnostic
DRIVE LEGEND: mA rating is for CHIPS standard cells.

| Pin Assignments |
|---|
| 1 VSS |
| 2 PROCCLK |
| 3 CLK1 |
| 4 CLK2 |
| 5 LA0 |
| 6 LA1 |
| 7 LA2 |
| 8 LA3 |

-continued

| Pin Assignments |
|---|
| 9 LA4 |
| 10 LA5 |
| 11 LA6 |
| 12 LA7 |
| 13 LA8 |
| 14 LA9 |
| 15 LA10 |
| 16 LA11 |

-continued

| | Pin Assignments |
|---|---|
| 17 | LA12 |
| 18 | LA13 |
| 19 | VCC |
| 20 | LA14 |
| 21 | LA15 |
| 22 | VSS |
| 23 | LA16 |
| 24 | LA17 |
| 25 | LA18 |
| 26 | LA19 |
| 27 | LA20 |
| 28 | LA21 |
| 29 | LA22 |
| 30 | LA23 |
| 31 | S0- |
| 32 | S1- |
| 33 | BHE- |
| 34 | M/IO- |
| 35 | CPUHLDA |
| 36 | HOLD |
| 37 | READY- |
| 38 | ROMCS- |
| 39 | PWRGOOD |
| 40 | OWS |
| 41 | IOCHRDY |
| 42 | IOCHCK- |
| 43 | DACK3- |
| 44 | DREQ3 |
| 45 | DACK2- |
| 46 | DREQ2 |
| 47 | DACK1- |
| 48 | DREQ1 |
| 49 | IRQ9 |
| 50 | IRQ7 |
| 51 | IRQ6 |
| 52 | IRQ5 |
| 53 | IRQ4 |
| 54 | IRQ3 |
| 55 | T/C |
| 56 | BUSCLK |
| 57 | BALE |
| 58 | SA0 |
| 59 | VSS |
| 60 | XD0 |
| 61 | XD1 |
| 62 | VCC |
| 63 | XD2 |
| 64 | XD3 |
| 65 | XD4 |
| 66 | XD5 |
| 67 | XD6 |
| 68 | XD7 |
| 69 | XD8 |
| 70 | XD9 |
| 71 | XD10 |
| 72 | XD11 |
| 73 | XD12 |
| 74 | XD13 |
| 75 | XD14 |
| 76 | XD15 |
| 77 | XMEMR- |
| 78 | XMEMW- |
| 79 | XIOR- |
| 80 | XIOW- |
| 81 | LMEGCS- |
| 82 | MEMCS16- |
| 83 | IOCS16- |
| 84 | IRQ10 |
| 85 | IRQ11 |
| 86 | IRQ12 |
| 87 | IRQ15 |
| 88 | IRQ14 |
| 89 | DACK0- |
| 90 | DREQ0 |
| 91 | DACK5- |
| 92 | DREQ5 |
| 93 | DACK6- |
| 94 | DREQ6 |
| 95 | DACK7- |
| 96 | DREQ7 |
| 97 | MASTER- |

-continued

| | Pin Assignments |
|---|---|
| 98 | MODA20 |
| 99 | VSS |
| 100 | CASL- |
| 101 | CASH- |
| 102 | VCC |
| 103 | NWE- |
| 104 | RAS3 |
| 105 | RAS2 |
| 106 | RAS1 |
| 107 | RAS0 |
| 108 | MA0 |
| 109 | MA1 |
| 110 | MA2 |
| 111 | MA3 |
| 112 | MA4 |
| 113 | MA5 |
| 114 | MA6 |
| 115 | MA7 |
| 116 | MA8 |
| 117 | MA9 |
| 118 | PARL |
| 119 | PARH |
| 120 | VSS |
| 121 | OX2 |
| 122 | OX1 |
| 123 | SPKOUT |
| 124 | REFRESH- |
| 125 | IRQ1 |
| 126 | CPURSTIN |
| 127 | NPBZ- |
| 128 | ERROR- |
| 129 | GATEA20IN |
| 130 | 8042CS- |
| 131 | NPCS- |
| 132 | NPRST |
| 133 | BUSY- |
| 134 | XRST |
| 135 | SDIRL |
| 136 | SDIRH |
| 137 | ADRL- |
| 138 | CPURST |
| 139 | VCC |
| 140 | OSCI |
| 141 | PS |
| 142 | VSS |
| 143 | NMI |
| 144 | INTR |
| 145 | LD15 |
| 146 | LD7 |
| 147 | LD14 |
| 148 | LD6 |
| 149 | LD13 |
| 150 | LD5 |
| 151 | LD12 |
| 152 | LD4 |
| 153 | LD11 |
| 154 | LD3 |
| 155 | LD10 |
| 156 | LD2 |
| 157 | LD9 |
| 158 | LD1 |
| 159 | LD8 |
| 160 | LD0 |

What is claimed is:

1. A logic support chip for use in combination with (a) an external processor having local address and data buses, and (b) a pair of external 8-bit bidirectional buffers, referred to as the external buffers, to implement an AT-compatible microcomputer system, the microcomputer system being characterized by a low-impedance 16-bit data bus, designated the SD-bus, and a high-impedance data bus, designated the XD-bus, the chip comprising:

a first set of 16 pins adapted to be coupled to the external processor's local data bus, said first set of pins defining a first data bus interface;

a second set of 16 pins adapted to be coupled to the external buffers via an external 16-bit XD-bus, said second set of pins defining a second data bus interface;

an internal 16-bit data bus coupled between said first and second sets of pins;

said internal data bus and the external XD-bus each having high-order and low-order 8-bit segments;

said first and second data bus interfaces being the chip's only data bus interfaces;

a third set of pins, including first and second direction control pins adapted to be coupled to direction control inputs on the external buffers;

swapper means, coupled between said high-order and low-order segments of said internal data bus and responsive to swapper control signals, for directing data on either segment of said internal data bus onto the other segment of said internal data bus; and data path control means, coupled to said swapper means and said first and second direction control pins, for generating said swapper control signals and a pair of direction control signals, said direction control signals being provided to said direction control pins and being adapted to control the respective directions of the external buffers.

2. The chip of claim 1 wherein the chip has a total number of pins that is no more than 160.

3. The chip of claim 1 wherein the chip has a total number of pins that is no more than 160.

4. An AT-compatible computer comprising:

a microprocessor having local address and data bus pins;

an external 16-bit XD-bus, said external XD-bus having high-order and low-order 8-bit segments;

an external 16-bit SD-bus, said external SD-bus having high-order and low-order 8-bit segments;

said XD-bus and said SD-bus being characterized by respective impedances, the impedance of said XD-bus being significantly higher than the impedance of said SD-bus;

a first bidirectional buffer coupling the high-order segments of said XD-bus and said SD-bus;

a second bidirectional buffer coupling the low-order segments of said XD-bus and said SD-bus;

each buffer having a respective direction control input;

a single-chip support circuit, referred to as the chip, the chip having a first set of address pins, a first set of data pins, a second set of data pins, and a set of direction control pins;

an internal address bus on the chip;

an internal data bus on the chip, said internal data bus having high-order and low-order 8-bit segments;

means, located on the chip, for interfacing said internal address bus to said local address bus at said first set of address pins;

means, located on the chip, for interfacing said internal data bus to said local data bus at said first set of data pins;

means, located on the chip, for interfacing said internal data bus to said XD-bus at said second set of data pins;

a swapper circuit on the chip, interposed between the high-order and low-order segments of said internal data bus, said swapper being operable, in response to swapper control signals, to drive data appearing on one of the 8-bit segments of said internal data bus onto the other 8-bit segments of said internal data bus; and a data path control circuit on the chip, coupled to said swapper circuit and to said direction control pins, for providing (a) direction control signals to said first and second bidirectional buffers, and (b) internal control signals to said swapper circuit.

5. The computer of claim 4 wherein said microprocessor is an 80286.

6. The computer of claim 4 wherein said data path control means is able to provide signals to said first and second bidirectional buffers and said swapper to permit data on one segment of said external XD-bus to be communicated onto the corresponding segment of said XD-bus, onto the corresponding segment of said internal data bus, through said swapper, onto the other segment of said internal data bus, onto the other segment of said XD-bus, and onto the other segment of said SD-bus.

7. The computer of claim 4 wherein said support chip has a total of no more than 160 pins.

8. A logic support chip for use in combination with (a) an external processor having local address and data buses, and (b) a pair of external 8-bit bidirectional buffers, referred to as the external buffers, to implement an AT-compatible microcomputer system, the microcomputer system being characterized by a 16-bit data bus, designated the SD-bus, and a data bus, designated the XD-bus, the SD-bus and the XD-bus being characterized by respective drive current requirements, the drive current requirement for the SD-bus being greater than that for the XD-bus, the chip comprising:

a first set of 16 pins adapted to be coupled to the external processor's local data bus, said first set of pins defining a first data bus interface;

a second set of 16 pins adapted to be coupled to the external buffers via an external 16-bit XD-bus, said second set of pins defining a second data bus interface;

said first and second data bus interfaces being the chip's only data bus interfaces;

a third set of pins, including first and second direction control pins adapted to be coupled to direction control inputs on the external buffers;

a fourth set of pins adapted to be coupled to the processor's local address bus;

an internal 16-bit data bus;

first and second sets of transceivers coupling said internal data bus to said first and second sets of pins, respectively, said second set of transceivers having respective driver portions capable of meeting the drive current requirement for the XD-bus but not that for the SD-bus;

an internal address bus coupled to said fourth set of pins;

said internal data bus and the external XD-bus each having high-order and low-order 8-bit segments;

a data swapper coupled between said high-order and low-order segments of said internal data bus and responsive to swapper control signals, operable to direct data on either segment of said internal data bus onto the other segment of said internal data bus;

means, coupled to at least a portion of said internal address bus, for generating a set of I/O decode signals;

means, coupled to said data swapper for generating said swapper control signals; and means, responsive to at least some of said I/O decode signals, for generating a pair of direction control signals, said direction control signals being provided to said direction control pins and being adapted to control the respective directions of the external buffers.

9. An AT-compatible computer comprising:

a microprocessor having local address and data bus pins;

an external 16-bit XD-bus, said external XD-bus having high-order and low-order 8-bit segments;

an external 16-bit SD-bus, said external SD-bus having high-order and low-order 8-bit segments;

said SD-bus and said XD-bus being characterized by respective drive current requirements, the drive current requirement for said SD-bus being greater than that for said SD-bus;

a first bidirectional buffer coupling the high-order segments of said XD-bus and said SD-bus;

a second bidirectional buffer coupling the low-order segments of said XD-bus and said SD-bus;

each buffer having a respective direction control input;

a single-chip support circuit, referred to as the chip, the chip having a first set of address pins, a first set of data pins, a second set of data pins, and a set of direction control pins;

an internal address bus on the chip;

an internal data bus on the chip, said internal data bus having high-order and low-order 8-bit segments;

a set of address transceivers, located on the chip, for interfacing said internal address bus to said local address bus at said first set of address pins;

a first set of data transceivers, located on the chip, for interfacing said internal data bus to said local data bus at said first set of data pins;

a second set of data transceivers, located on the chip, for interfacing said internal data bus to said XD-bus at said second set of data pins;

a swapper circuit on the chip, interposed between the high-order and low-order segments of said internal data bus, said swapper being operable, in response to swapper control signals, to drive data appearing on one of the 8-bit segments of said internal data bus onto the other 8-bit segment of said internal data bus;

a data path control circuit on the chip, for providing (a) direction control signals to said first and second bidirectional buffers, and (b) internal swapper control signals to said swapper circuit.

10. The computer of claim 9 wherein said microprocessor is an 80286.

11. The computer of claim 9 wherein said microprocessor is an 80286 and said chip has a total number of pins that is no more than 160.

* * * * *

UNITED STATES PATENT AND TRADEMARK OFFICE
CERTIFICATE OF CORRECTION

PATENT NO. : 5,125,080

DATED : June 23, 1992

INVENTOR(S) : Robert M. Pleva et al.

It is certified that error appears in the above-identified patent and that said Letters Patent is hereby corrected as shown below:

Claim 3, at column 11, line 29, please change "1" to --8--.

Claim 6, at column 12, line 13, after "data on one segment of said external" please change "XD-bus" to -- SD-bus--.

Signed and Sealed this

Ninth Day of November, 1993

*Attest:*

BRUCE LEHMAN

*Attesting Officer*     *Commissioner of Patents and Trademarks*